(12) United States Patent
Sauret et al.

(10) Patent No.: US 10,495,253 B2
(45) Date of Patent: Dec. 3, 2019

(54) CAMERA SKATER DOLLY, RAIL AND CLAMP SYSTEM

(71) Applicants: Etienne Sauret, New York, NY (US); James Schwartz, New York, NY (US)

(72) Inventors: Etienne Sauret, New York, NY (US); James Schwartz, New York, NY (US)

(*) Notice: Subject to any disclaimer, the term of this patent is extended or adjusted under 35 U.S.C. 154(b) by 302 days.

(21) Appl. No.: 15/486,299

(22) Filed: Apr. 13, 2017

(65) Prior Publication Data

US 2017/0299112 A1 Oct. 19, 2017

Related U.S. Application Data

(60) Provisional application No. 62/323,600, filed on Apr. 15, 2016.

(51) Int. Cl.

| | |
|---|---|
| *B61B 5/02* | (2006.01) |
| *F16M 11/42* | (2006.01) |
| *B61B 9/00* | (2006.01) |
| *B61B 3/02* | (2006.01) |
| *G03B 17/56* | (2006.01) |
| *F16M 11/18* | (2006.01) |

(52) U.S. Cl.
CPC ............ *F16M 11/425* (2013.01); *B61B 3/02* (2013.01); *B61B 5/02* (2013.01); *B61B 9/00* (2013.01); *F16M 11/18* (2013.01); *G03B 17/561* (2013.01)

(58) Field of Classification Search
CPC .... B61B 3/02; B61B 5/02; B61B 9/00; F16M 11/425; G03B 17/561; A63H 18/06; A63H 19/30; F16L 3/2235; F16L 3/237; F16L 55/035; F16L 3/222; F16L 3/221; F16L 3/223; E01B 23/02; H02G 3/32; B28D 1/044
USPC .......................................... 238/10 R; 248/68.1
See application file for complete search history.

(56) References Cited

U.S. PATENT DOCUMENTS

| | | | | |
|---|---|---|---|---|
| 3,763,845 | A | * 10/1973 | Hiestand ................... | B23Q 1/40 125/14 |
| 4,273,465 | A | * 6/1981 | Schoen ..................... | F16L 3/237 248/67.5 |

(Continued)

OTHER PUBLICATIONS

Dana Dolly: Portable Camera Dolly System, printed from www.danadolly.com, company website product pages.

(Continued)

*Primary Examiner* — Mark T Le
(74) *Attorney, Agent, or Firm* — Stanley D. Liang; Liang & Hennessey LLP

(57) ABSTRACT

A track system on which a skater dolly can roll, comprising one or more pairs of rails and one or more rail clamps. Each rail clamp supports one or two pairs of rails. Rails held side-by-side are parallel to each other. Rail clamps can also secure two rails in end-to-end configuration. The distance between rails can be about 5/16 of an inch. The track system can include a skater dolly, the load-bearing wheels of which are angled 20-30 degrees away from vertical to provide clearance past the rail clamps. The skater also has stabilizing wheels that are approximately perpendicular to the load-bearing wheels, and which secure the skater to the rails when the skater is in a non-upright e.g. upside-down orientation. The system can include a motor pulley system that moves the skater along the rails.

7 Claims, 13 Drawing Sheets

(56) References Cited

U.S. PATENT DOCUMENTS

| | | | | |
|---|---|---|---|---|
| 4,416,456 | A * | 11/1983 | Knight | B60T 13/22 |
| | | | | 104/120 |
| 8,721,199 | B1 * | 5/2014 | Hart | F16M 11/045 |
| | | | | 396/428 |
| 9,046,743 | B2 * | 6/2015 | Koymen | G03B 17/561 |
| 9,494,277 | B2 | 11/2016 | Sauret | |
| 9,625,084 | B2 * | 4/2017 | Garland | G03B 17/561 |
| 2004/0164209 | A1 * | 8/2004 | Pachao-Morbitzer | |
| | | | | B65D 71/0092 |
| | | | | 248/68.1 |
| 2014/0299013 | A1 * | 10/2014 | Hall | B61B 13/00 |
| | | | | 104/307 |
| 2015/0234258 | A1 * | 8/2015 | Hida | G03B 17/561 |
| | | | | 396/428 |

OTHER PUBLICATIONS

Kessler Crane, printed from www.kesslercrane.com, company website pages re Pocket Dolly 3 and others.
Motion Impossible, printed from www.motion-impossible.com, company website pages re Mantis dolly.

\* cited by examiner

CAMERA SKATER DOLLY, RAIL AND CLAMP SYSTEM

CROSS REFERENCE TO RELATED APPLICATIONS

This application claims priority to U.S. Ser. No. 62/323,600, filed on Apr. 15, 2016, the contents of which are hereby incorporated by reference in their entirety.

TECHNICAL FIELD

The present invention relates generally to moveable dolly systems for cameras, in which the dolly is mounted on a track or rail assembly such as a pair of rails. The invention provides a skater dolly, rail and clamp system for such movement.

BACKGROUND ART

Skater (or "slider") dolly systems provide a means for moving a camera or other equipment smoothly along a predetermined path. They are widely used in the movie industry. They comprise parallel rails on which a skater dolly is mounted. The parallel rails must somehow be secured in position in relation to each other. This may be accomplished by a tie or coupler that is attached to each rail. The skater typically comprises wheels on which the skater rolls along the rails. The skater also comprises a platform to which a tripod or other equipment support is attached or mounted. A camera or other equipment is mounted on the tripod or other support. Current skater dolly systems are difficult to use for various reasons, including that it is cumbersome and difficult to assemble the rails; rails and couplers are typically costly; the rail-to-rail distance typically ranges from about 8 inches to about 24 inches, which limits the usefulness of rails in confined spaces; few systems provide for the use of a motorized dolly; rail length is subject to specific limits, consequently limiting flexibility with respect to the distance a camera can travel; couplers typically are limited in that they can only be used in the rail system they were designed for.

There remains a need for a more versatile and easy-to-use system that comprises a skater dolly, rail and clamp, wherein the system can be used in confined spaces, provides easy portability, and provides greater ease of assembly and use than current systems. At the same time, a system is desirable that possesses a low profile and small size so that, for example, the image captured by a camera mounted on the dolly includes little or none of the equipment itself. The inventive system described herein provides these and other advantages.

SUMMARY OF INVENTION

The present invention provides, in one embodiment, a camera skater dolly (also referred to herein as a skater, slider dolly, and slider), rail and clamp system. In an embodiment, the system comprises three components: a skater dolly, two rails (the terms "rail" and "pipe" are used interchangeably throughout the specification), and one or more clamps. See FIGS. 1-5C. The clamps function to hold the rails parallel to each other and a prescribed distance apart from each other. A notable aspect of the invention is that the prescribed distance between rails is very short, in the range of from about one-quarter inch (¼") to 3 inches (3"), such as 5/16 inches, one-half inch (½), one inch (1"), or one and one-half inches (1½"). Also notably, the clamps can simultaneously be used to hold side-by-side rails parallel to each other and to join rails in series, in line in and end-to-end linear configuration. A combination of clamps and pipes thus can provide a set of rails in a great variety of lengths, depending on the user's needs. The clamps comprise a top and bottom plate joined by a screw. The pipes are positioned between the top and bottom plate and the screw is tightened, thus pressing the top and bottom plates against the pipes. In an embodiment, the top plate is configured and positioned such that it makes one contact with each pipe, while the bottom plate is configured and positioned such that it makes two contacts with each pipe. The clamp thus can offer the advantage of simple assembly with a single screw while securely holding the pipes.

The skater dolly can resemble a standard wheeled dolly as known and used in the art, modified to include an angled set of four top wheels, and a set of four side (also referred to as "stabilizing") wheels. The top wheels function as load-bearing wheels when the dolly is in upright position and, in an embodiment, are larger than the four stabilizing wheels. A novel aspect of the invention is that the four top wheels are angled away from vertical so that their path is not impeded by the top plate of the clamp. While the load-bearing wheels make contact with the top or upper half of the rail, the four side wheels make contact with the bottom or lower half of the rail. The smaller wheels secure the skater to the rails such that the skater remains on the rails in any orientation between and including right-side-up and upside-down, such as sideways (one rail above the other).

In another embodiment, the system comprises, as described above, a skater dolly, two rails, and one or more clamps, and further comprises a motor mounted on the skater, the motor being attached to a pulley, and further comprises a belt secured next to and parallel to the rails, such that the motor functions to provide hands-free propulsion of the skater along the rails. See FIGS. 6-10. The non-motorized and motorized embodiments each may further include a camera mounted on the skater dolly directly or via a tripod or other mounting system, such as the four-legged high-hat described in U.S. Patent Application Publication 2015/0226371 ("equipment mounting module," see, e.g., '371 publication at FIG. 6E).

In another embodiment, the system comprises two rails and one or more clamps, as described above. See FIGS. 11-12.

The invention further provides a track system on which a skater dolly can roll, comprising one or more pairs of side-by-side rails and one or more rail clamps, wherein at least one rail clamp comprises a clamp top, a clamp bottom and a clamp screw that joins the clamp top to the clamp bottom, and said at least one rail clamp secures in place at least one pair of rails, and holds each member of each secured pair parallel to the other member of the pair, the distance between rails is between about 5/16 inches and about 3 inches, the clamp top comprises two angled lower surfaces, each of which makes contact with one of the rails, and the clamp bottom comprises two depressions, each of which supports one rail.

In an embodiment of such a system, each depression of the clamp bottom is formed by three flat faces angled such that one face is horizontal and the other two are non-horizontal, and each non-horizontal face makes contact with the rail that the corresponding depression supports while the horizontal face does not make such contact. In a preferred embodiment, the distance between rails is about 5/16 inches. In another embodiment, such a system further comprises a skater dolly, wherein the skater dolly comprises a set of four load-bearing wheels and a set of four stabilizing wheels, wherein the load-bearing wheels are angled 20-30 degrees away from vertical and the stabilizing wheels are about perpendicular to the load-bearing wheels. Such a system may further comprise a motor pulley system that moves the skater along the rails, wherein the motor pulley system comprises a motor assembly mounted on the skater, a belt, and idler pulleys.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF DRAWINGS

In the drawings, wherein like reference characters denote corresponding or similar elements throughout the various figures.

DETAILED DESCRIPTION OF EMBODIMENTS

Figure 1:
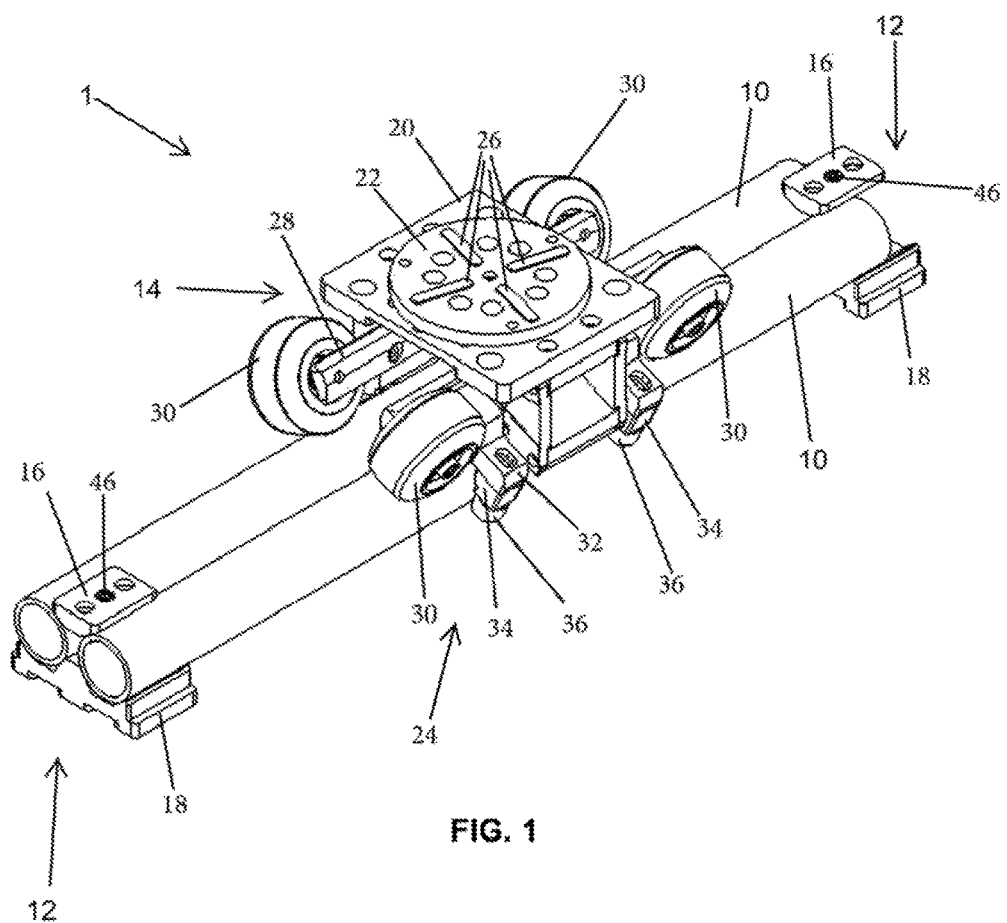
FIG. 1 is an isometric view of an embodiment of the system 1 (not motorized), showing back and front rails 10, left and right rail clamps 12 holding the rails in place, and the skater dolly 14 with carriage plate 20 and flat mounting plate 22.

Referring now to FIG. 1, the invention provides, in one embodiment, a system 1 that comprises a camera skater dolly 14, two parallel rails 10 and one or more rail clamps 12. The rail clamps 12 hold the rails 10 parallel to each other and a prescribed distance apart from each other. The prescribed distance between rails is very small, in the range of from one-quarter inch (¼") to 3 inches (3"), such as about 5/16 of an inch, one-half inch (½"), one inch (1"), or one and one-half inches (1½"). The rail clamps 12 comprise a clamp top 16 and clamp bottom 18 joined by a screw 46, which can be an internal hex screw or any other suitable screw. Rail clamp 12 can be made of any suitable material, such as a metal such as stainless steel or aluminum, or it can be made of a suitable plastic. The pipes 10 can be made of any suitable material, such as a metal or plastic, such as aluminum or PAC, such as may be found in a hardware store. Pipes of a range of sizes can be used, such as pipes with an outer diameter of between 1 and 3 inches, between 1½ and 2½ inches, between 1½ and 2 inches, such as pipes with an outer diameter of 1.5 inches, 1.66 inches, and 1⅞ inches.

Still referring to FIG. 1, a carriage plate 20 is mounted on the chassis assembly 24, described in detail below. The carriage plate 20 can function as an attachment interface for the attachment of a camera or camera support such as a hi hat or camera head. Further, a flat mounting plate 22 can be mounted on the carriage plate and can also serve as an interface between the dolly and camera or camera support. The flat mounting plate 22 may include on its surface an array of protective rubber pads 26.

In an alternate embodiment, instead of the flat mounting plate 22, a level able bowl interface can be mounted on the carriage plate 20. The level able bowl interface can also serve as an interface between the dolly and camera or camera support.

Figure 2:
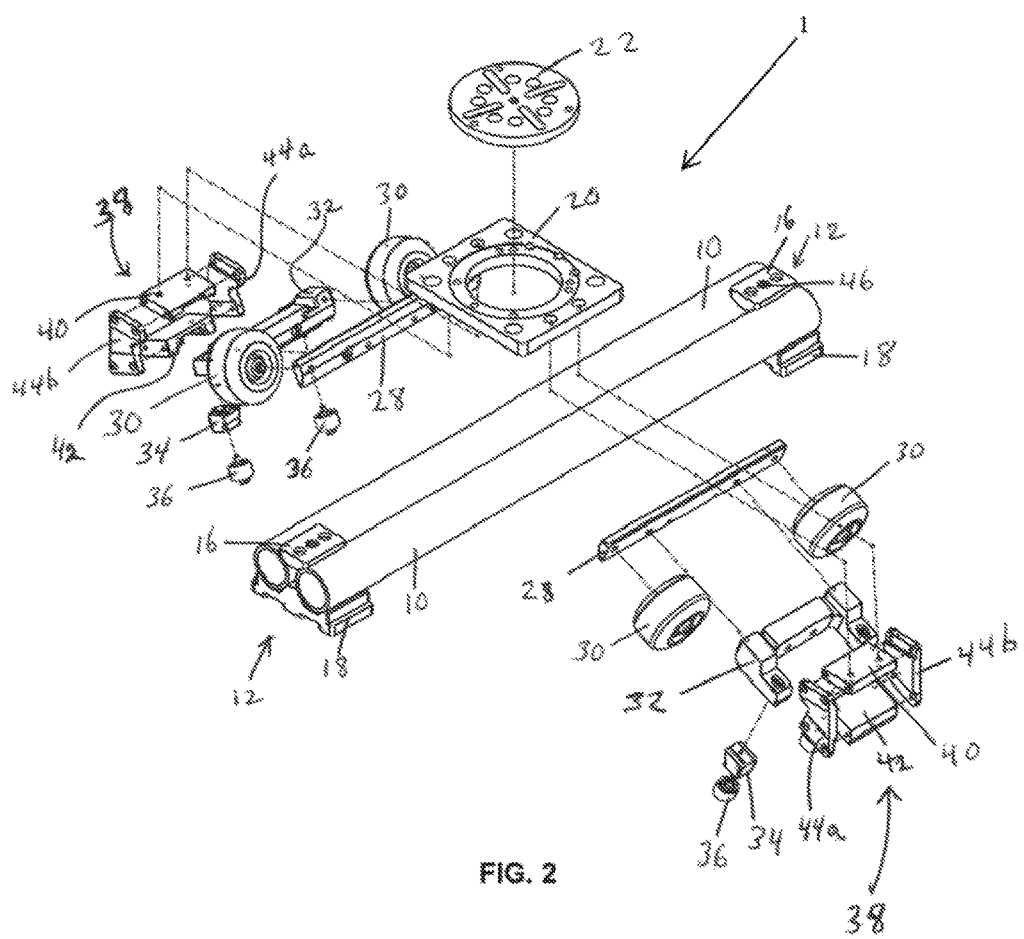
FIG. 2 is an exploded view of the skater dolly 14 with carriage plate 20 and flat mounting plate 22 of the system 1 shown in FIG. 1.
Figure 3:
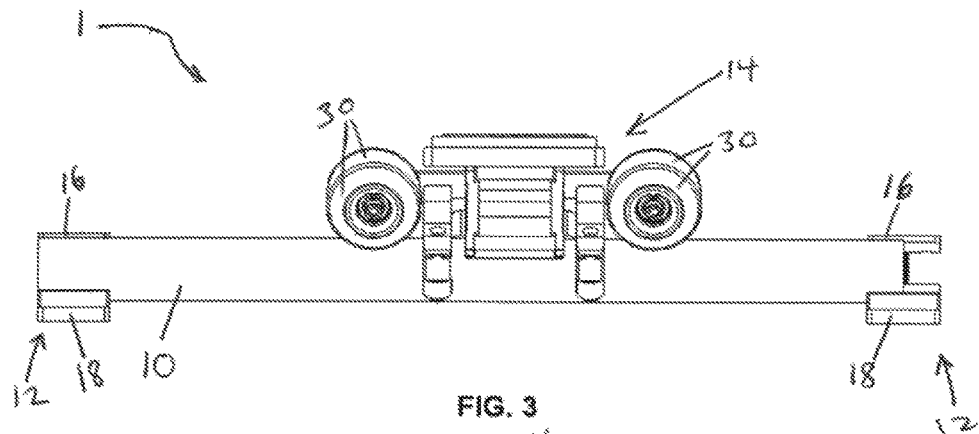
FIG. 3 is a front view of the embodiment of the system 1 shown in FIG. 1.

Referring now to FIG. 2, in the embodiment shown, the skater 14 comprises two chassis assemblies 24. Chassis assembly 24 comprises: a top wheel bracket 28, to which is attached a pair of large, fixed, urethane, load-bearing wheels 30; a side wheel bracket 32, which also is attached to the top wheel bracket 28; a pair of stabilizing wheels 36 which are mounted on linearly adjustable brackets 34, which in turn are mounted on the side wheel bracket 32; and a carriage connection plate assembly 38. In this embodiment, the stabilizing wheels 36 are smaller than, and perpendicular to, the urethane load-bearing wheels 30. Each carriage connection plate assembly 38 comprises a carriage connection assembly top 40, a carriage connection assembly bottom 42, and carriage connection assembly left and right sides 44a and 44b. In the embodiment illustrated, carriage connection assembly left and right sides 44a and 44b are handed, that is, they are non-superposable mirror images of each other. In other embodiments, carriage connection assembly left and right sides 44a and 44b may be identical to each other and thus interchangeable with each other. The carriage plate 20 attaches to and is parallel to the carriage connection assembly top 40. The carriage connection assembly sides 44a and b feature an angled edge such that the carriage connection assembly bottom 42 is not parallel to the carriage connection assembly top 40. The top wheel brackets 28 are attached to the carriage connection assembly bottom 42 of the carriage connection assembly 38. Consequently, the top wheel bracket 28, and the load-bearing wheels 30 attached thereto, are angled at a fixed angle relative to the carriage connection assembly top 40 and the carriage plate 20. This fixed angle can be set in the range of about 20 degrees to about 30 degrees. In the embodiment pictured, the fixed angle is about 25 degrees. The angling of the load-bearing wheels permits them to roll past the clamp top 16.

Skater 14 components generally are made of suitable materials known and used in the art. In the skater 14 shown, the center-to-center distance of the top wheels 30 is about 7¾ inches and the center-to-center distance of the stabilizing wheels is about 4.23 inches. The person of ordinary skill in the art can vary these distances as desired. Top wheels 30 in this embodiment have an outer diameter of about 2.58 inches and the stabilizing wheels 36 have an outer diameter of about 0.75 inches.

In some embodiments, the skater dolly can assume an orientation other than upright, such as sideways or upside-down or any orientation between upright and upside-down. Reference to "top" and "load-bearing" wheels refers to the wheels that are "to" and "load-bearing" when the skater is in upright position, even though, in other orientations, those wheels are not necessarily top or load-bearing. Similarly, reference to "side" wheels refers to those wheels that are on the side when the skater is in upright position.

In certain of those embodiments of the invention that comprise a skater, the top wheels and side wheels are both made of urethane. In some embodiments, the side wheels are softer than the top wheels. Softer side wheels help to eliminate any bumps caused by, for example, irregularities or unevenness in the rails. In other embodiments, such as when the skater is used in a sideways or upside-down position, such that equipment mounted on the skater does not rest on top of the skater, the side wheels may be made of a harder urethane so that they possess greater load-bearing capacity. In still other embodiments that comprise a skater, the side wheels and/or the top wheels can be made of rubber, plastic, metal, or other suitable material.

Figure 4:
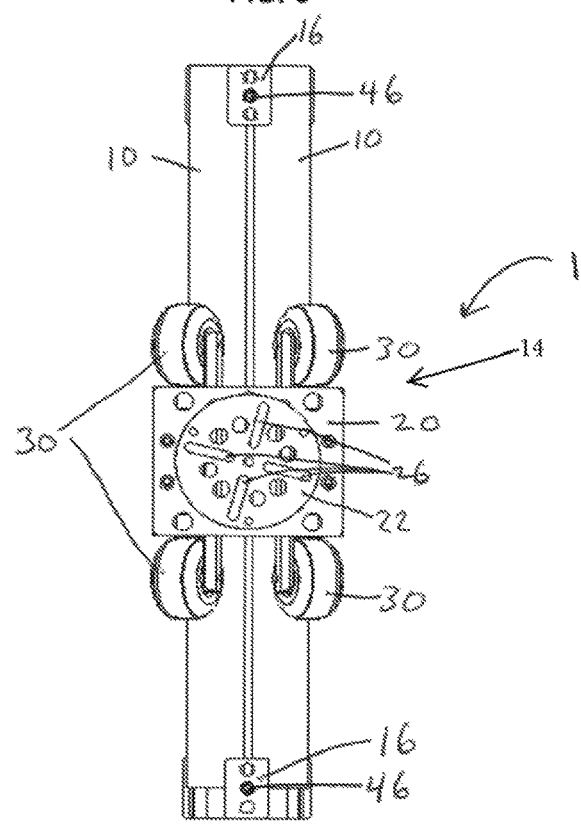
FIG. 4 is a top view of the embodiment of the system 1 shown in FIG. 1.

Referring now to FIG. 4, the exemplary embodiment shown illustrates the short distance between the rails 10, which distance can be about 5/16 of an inch, and also illustrates the angling of load-bearing wheels 30 symmetrically away from vertical, permitting the wheels to roll past clamp top 16.

Figure 5A:
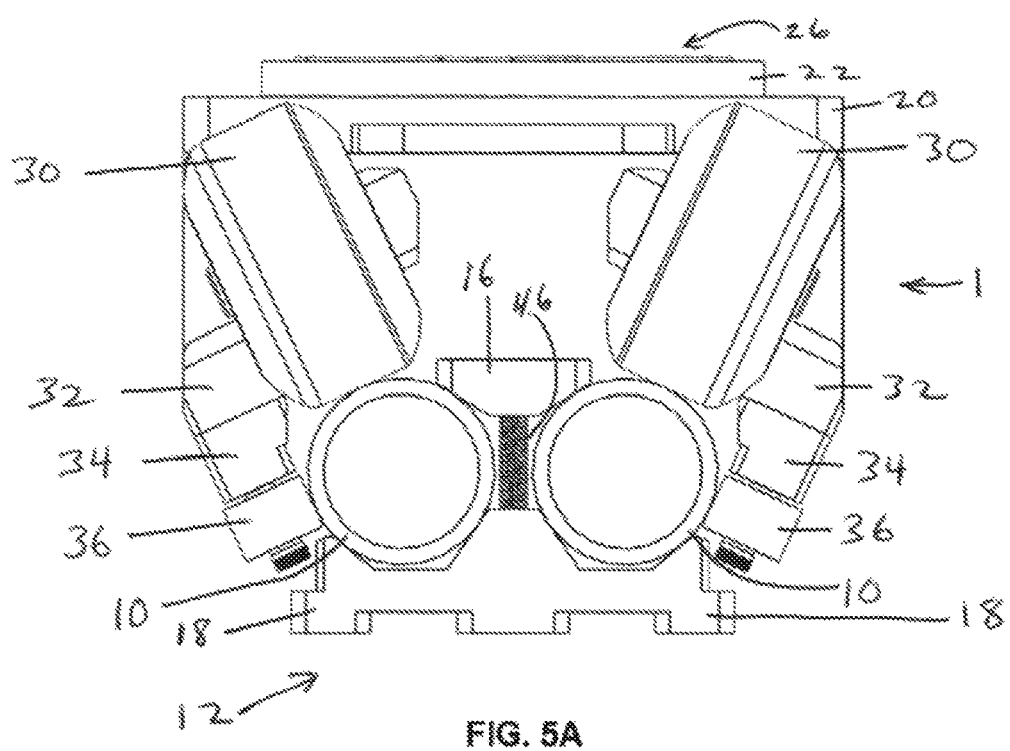
FIG. 5A is an enlarged side view of the system 1 shown in FIG. 1.

Referring now to FIG. 5A, the exemplary embodiment shown illustrates the angling of load-bearing wheels 30, the perpendicularity of stabilizing wheels 36 to load-bearing wheels 30, the joining of clamp top 16 to clamp bottom 18 by clamp screw 46, and the points at which the clamp top 16 and clamp bottom 18 contact rails 10. Clamp top 16 comprises two angled lower surfaces, each of which makes contact with one rail 10. Bracket bottom 18 comprises two depressions, each of which supports one rail 10. In this embodiment, each depression is formed by three flat faces angled substantially as shown in FIG. 5A, such that, as drawn, one face is horizontal and the other two are angled up. In the exemplary embodiment illustrated, the clamp top 16 is configured and positioned such that, when the clamp is tightened, it makes one contact with each pipe 10, while the clamp bottom 18 is configured and positioned such that, when the clamp is tightened, it makes two contacts with each pipe 10. Each pipe 10 touches two angled (non-horizontal) faces of clamp bottom 18. In the exemplary embodiment illustrated, the prescribed distance between the two rails is approximately 5/16 inches. In other embodiments, the prescribed distance can be less than or greater than 5/16 inches, such as in the range of from one-fourth (¼) to three (3) inches, such as, for example, 6, 7, 8, 9, 10, 11, or 12 sixteenths of an inch, or 1, 1¼, or 1½ inches. This distance may be selected by the user. Other dimensions may be varied proportionally, as necessary or desired, with the inter-rail distance. Clamp bottoms 18 of different widths can be prepared to provide different prescribed distances between the rails.

Still referring to FIG. 5A, the exemplary embodiment shown illustrates the ease of assembly of this embodiment of the inventive system. The pipes are positioned between the clamp top 16 and clamp bottom 18 and clamp screw 46 is tightened, thus pressing the top and bottom plates against the pipes 10 and securing the pipes in the clamp. The clamp thus can offer the advantage over the prior art of simple assembly with a single screw to achieve secure positioning of the pipes 10.

Still referring to FIG. 5A, in the exemplary embodiment shown, the outer diameter of each rail 10 is 1.66 inches. Such pipes are an ANSI/SAME standard size. They may typically be referred to as "1¼ Nominal Pipe Size" at a retail outlet such as a hardware store or metal supplier. The remaining structures are drawn to scale relative to the rails. All angles are substantially as shown. The system is salable to different sizes. In the exemplary embodiment shown, the center-to-center distance for pipes 10 is 2 inches. This distance can be varied, for example it may be increased, in accordance with the user's preference, by, for example, widening the central portion of clamp bottom 18 and adjusting other dimensions accordingly, while maintaining the pipe size, for example.

Figure 5B:
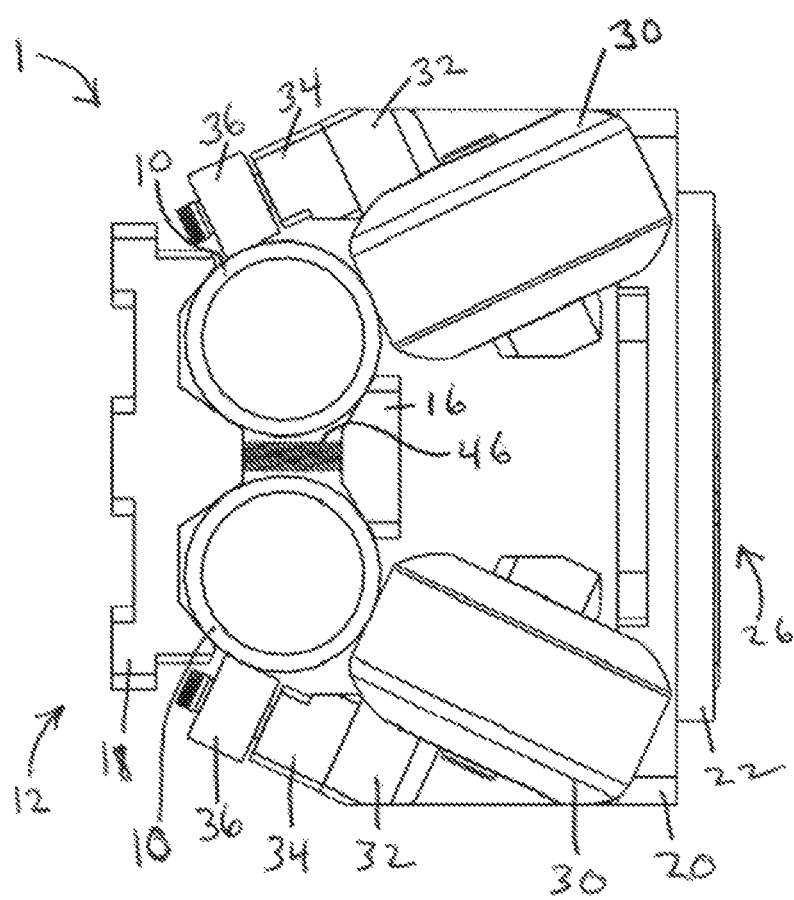
FIG. 5B is an enlarged side view of the system 1 shown in FIG. 1, rotated 90 degrees.

Still referring to FIG. 5A, in the exemplary embodiment shown, the left-to-right width of clamp bottom 18 may be about 3 to about 5 inches, for example about 4 inches, preferably 3.95 inches, and the front-to-back depth can be about 1.5 to about 4 inches, such as from about 2 to about 3 inches, for example, preferably 2.0 inches. In a preferred embodiment, the clamp bottom 18 can have the following further measurements: first, noting that clamp bottom 18's right and left half are symmetrical with each other; considering the top surface, there are three horizontal surfaces, one in the center and two on either side. In a preferred embodiment: the center horizontal surface is about 0.455 inches in length, the right and left horizontal surfaces are about 0.633 inches in length, the height of the center horizontal surface above the left and right horizontal surfaces is about 0.531 inches, the angle made by the left or right horizontal surface and the corresponding (inner) angled face that joins each to the center horizontal face is 125 degrees Referring now to FIG. 5B, in the exemplary embodiment shown, it can be seen that, by virtue of the positioning and orientation of the stabilizing wheels 36 relative to the load-bearing wheels 30, the skater 14 remains secured to the rails 10 when the skater, rail and clamp system 1 is rotated 90 degrees from horizontal.

Figure 5C:
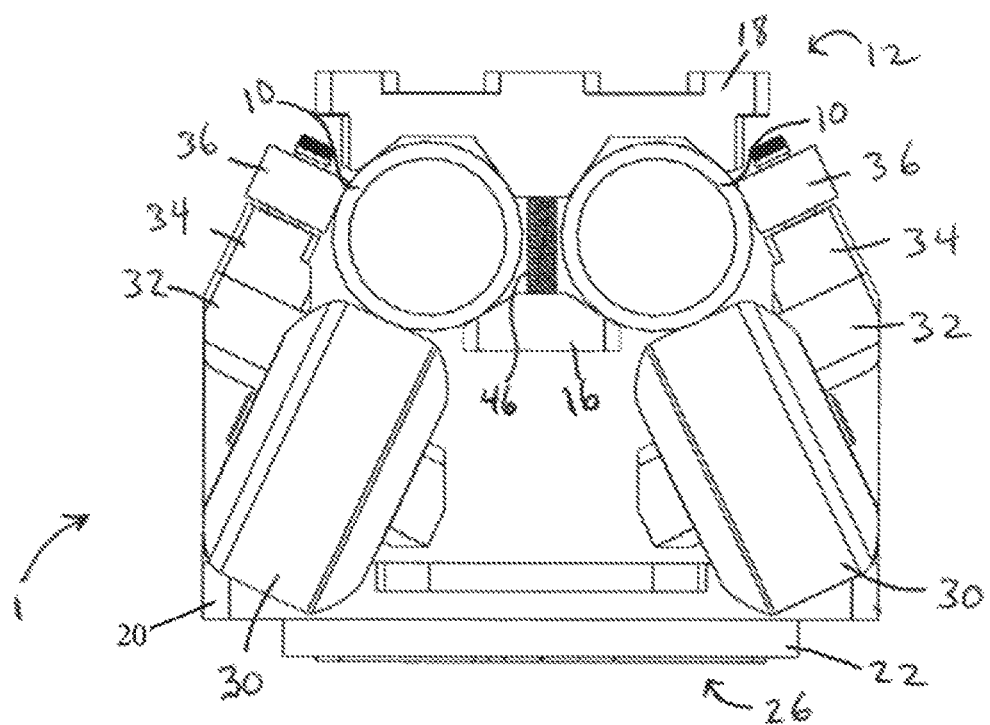
FIG. 5C is an enlarged side view of the system 1 shown in FIG. 1, rotated 180 degrees.

Referring now to FIG. 5C, in the exemplary embodiment shown, it can be seen that, by virtue of the perpendicularity of the stabilizing wheels 36 to the load-bearing wheels 30, the skater 14 remains secured to the rails 10 when the skater, rail and clamp system 1 is rotated 180 degrees from horizontal. A camera mounted on system 1 thus can be rotated away from a horizontal orientation while continuing to run smoothly along the rails 10 of the inventive system 1. For example, the inventive system 1 may be rotated about an axis that runs parallel to the rails 10 while a camera mounted on skater 14 runs along the rails.

Figure 6:
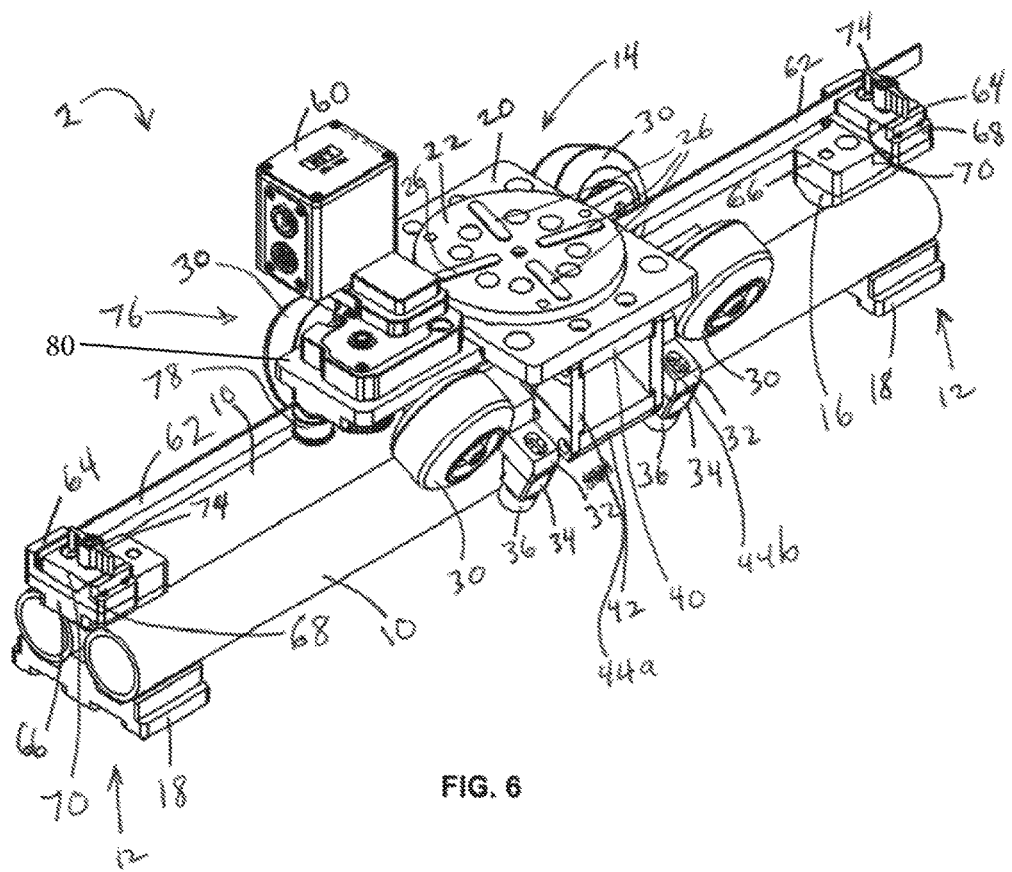
FIG. 6 is an isometric view of an embodiment of the system 2 (motorized), substantially the same as the system 1 of FIG. 1 except further comprising a motor assembly 60 mounted on the skater 14 and a belt 62 running the length of the rails, along which the motor assembly 60 pulls the skater 14.

Referring now to FIG. 6, the exemplary embodiment shown is substantially the same as the embodiment shown in FIG. 1 except the exemplary embodiment of the system 2 shown in FIG. 6 further comprises a motor assembly 60 mounted on the skater 14 and a belt 62 running the length of the rails, along which the motor assembly 60 pulls the skater 14. The belt 62 is secured in place by belt clamps 64, which comprise an outer piece belt clamp bottom 68 and inner piece belt clamp top 70. Motor pulley system 76 comprises the motor assembly 60, the belt 62, idler pulleys 78, and motor adapter plate 80.

Figure 7:
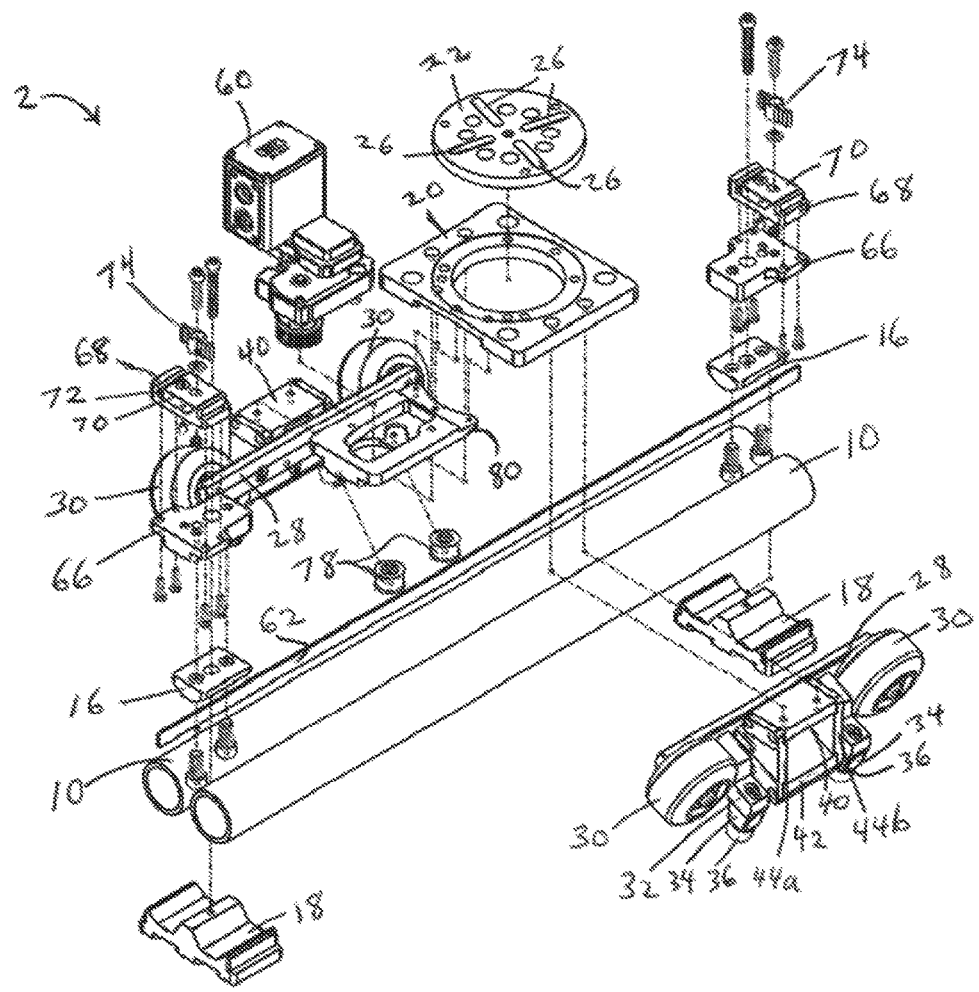
FIG. 7 is a partially exploded view of the embodiment of the system 2 shown in FIG. 6.
Figure 8:
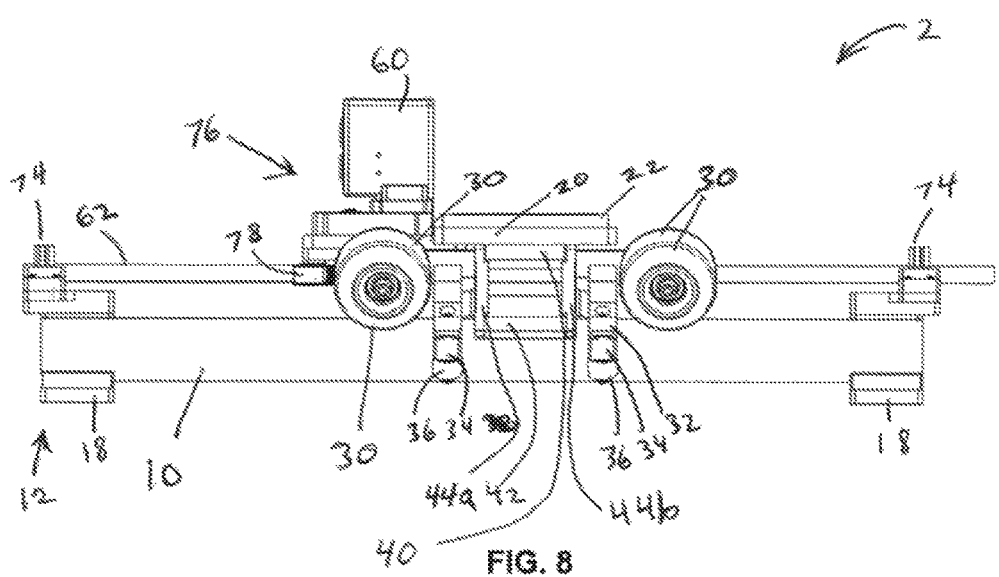
FIG. 8 is a front view of the embodiment of the system 2 shown in FIG. 6.
Figure 9:
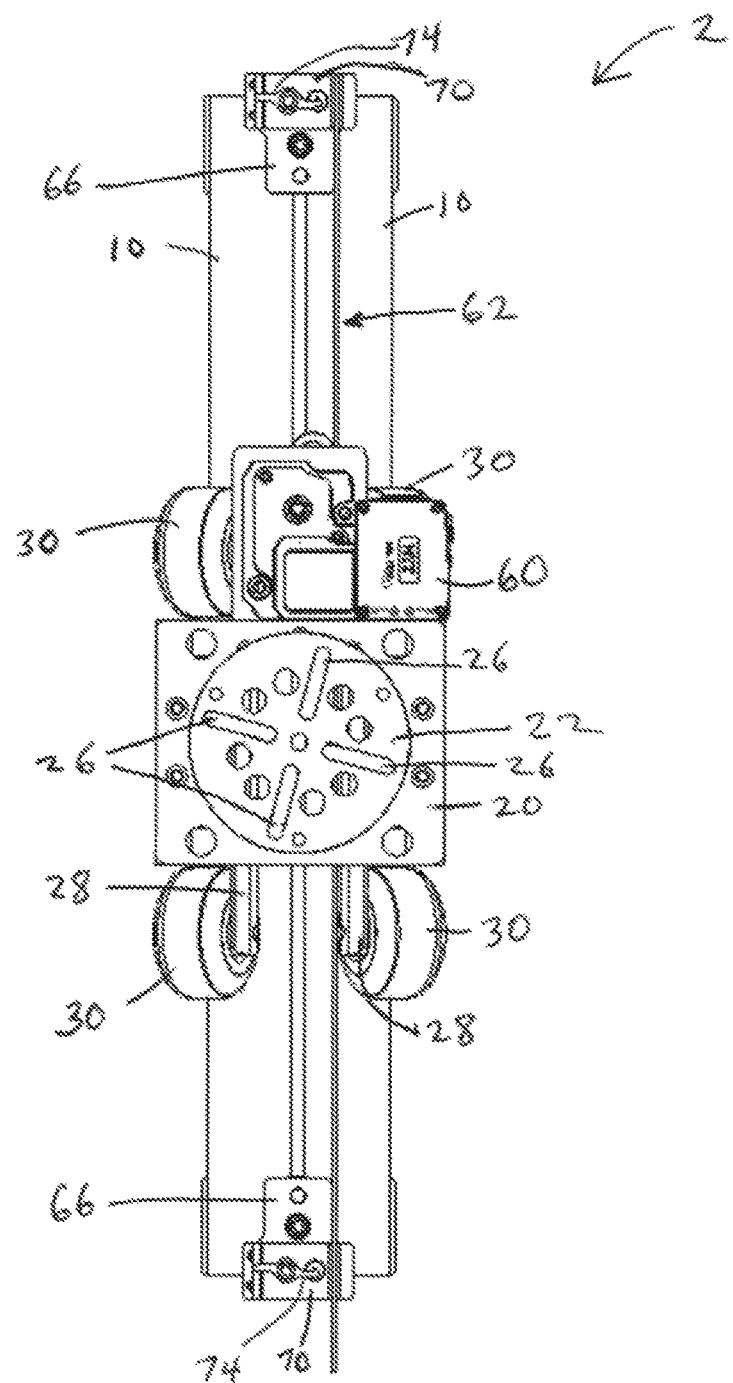
FIG. 9 is a top view of the embodiment of the system 2 shown in FIG. 6.

Referring now to FIG. 7, the exemplary embodiment of system 2 is the same as that of FIG. 6. Belt holder adapter plate 66 is mounted on and joined to clamp top 16. Belt clamp 64 comprises outer piece belt clamp bottom 68 and inner piece belt clamp top 70. Belt 62 fits vertically in belt clamp opening 72. Tightening of wing nut 74 forces belt clamp top 70 down along the inclined face of belt clamp bottom 68, thus causing belt clamp top 70 also to move laterally, narrowing opening 72 and securing the belt 62 vertically between the inside vertical face of belt clamp bottom 68 and the outer vertical face of belt clamp top 70. Motor pulley system 76 comprises the motor assembly 60, the belt 62, idler pulleys 78, and motor adapter plate 80. The motor assembly 60 is secured to motor adapter plate 80, which is mounted to the underside of carriage plate 20.

The idler pulleys 78 are affixed to the motor adapter plate 80 by one screw each. In the exemplary embodiment shown, a low friction bushing is used so that the idler pulleys 78 rotate freely. In other embodiments, a ball bearing, for example, could be used in place of a bushing. The motor assembly 60 provides the motive force that propels the skater 14 along the belt 62.

The motor assembly 60 in this embodiment comprises a motor housing, a motor with drive electronics, electronic connectors for interfacing to drive electronics, a drive train consisting of a multistage gear reduction, and an output timing belt pulley.

Figure 10:
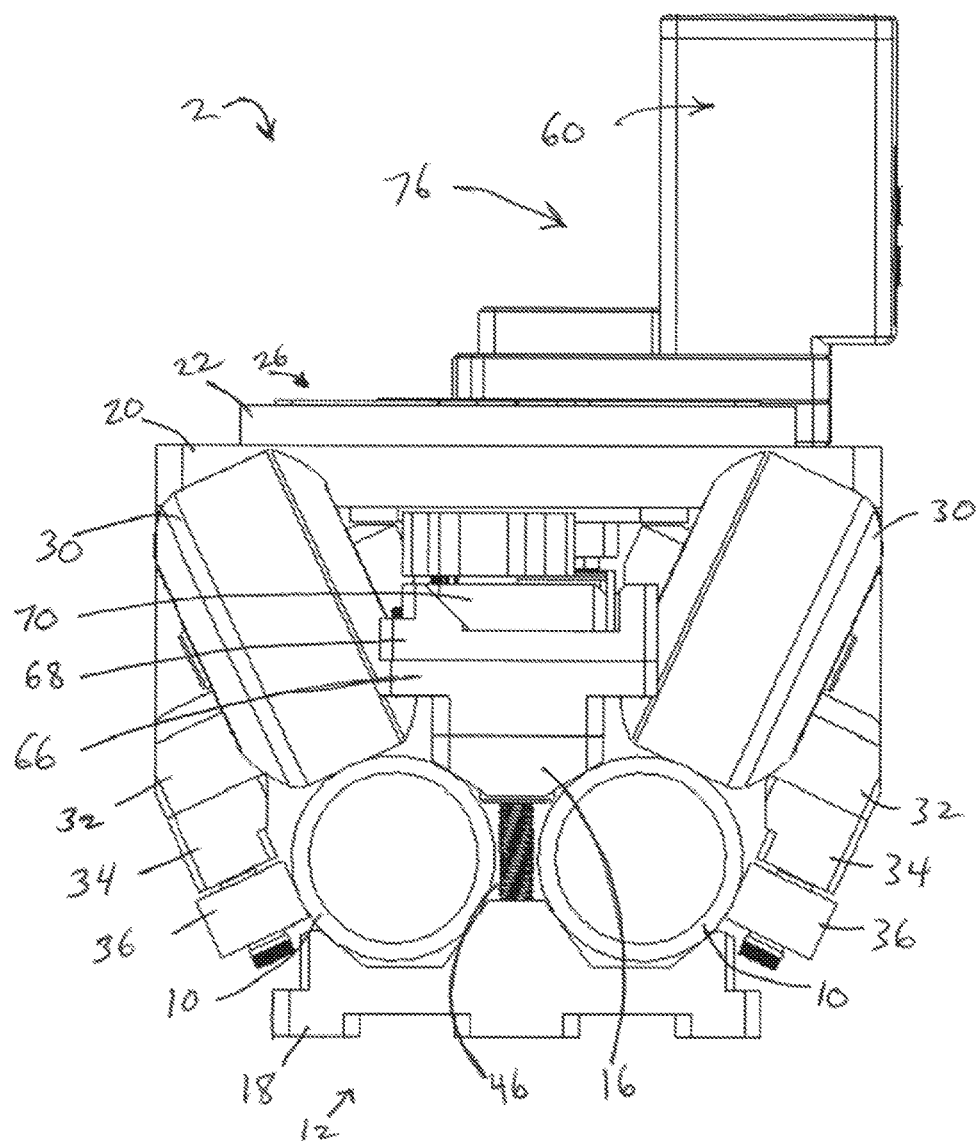
FIG. 10 is an enlarged side view of the system 2 shown in FIG. 6.

Turning now to FIG. 10, the exemplary motorized embodiment of system 2 is the same as that of FIG. 6. The embodiment as illustrated shows that it provides a stopping point for the motorized skater 14. It can be seen that the load-bearing wheels 30 cannot pass belt holder adapter plate 66 and belt clamp 64. Consequently, skater 14 cannot roll off the end of rails 10 during motorized movement.

Figure 11:
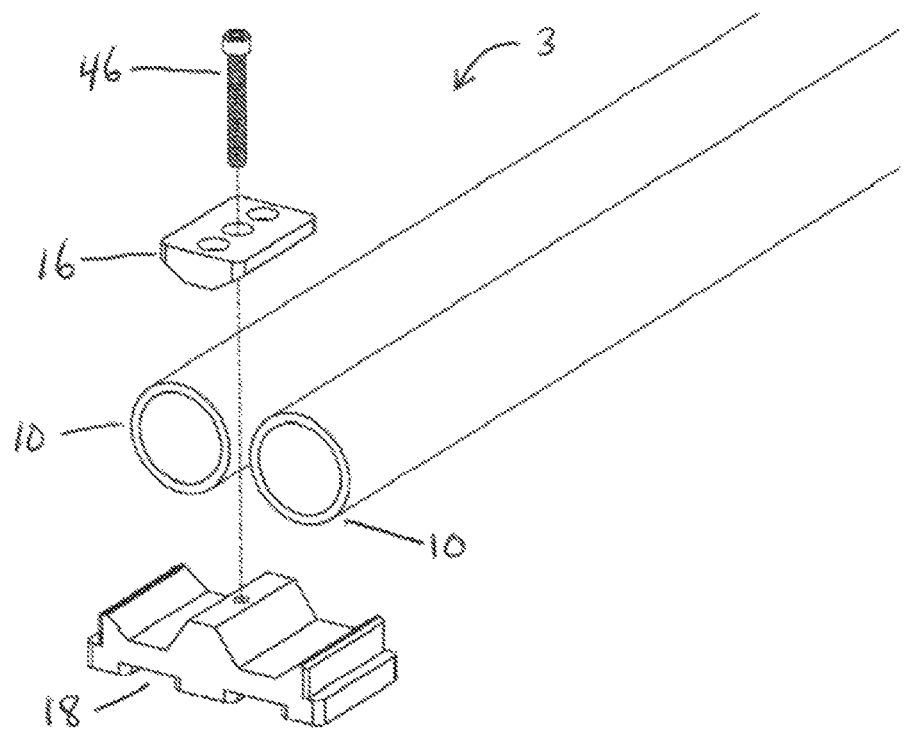
FIG. 11 is an exploded view of an embodiment of a system 3 comprising rails 10 and a rail clamp 12 that secures the rails, the clamp comprising the clamp top 16 joined by a clamp screw 46 to the clamp bottom 18.

Referring now to FIG. 11, the exemplary embodiment of system 3 as illustrated comprises two rails 10 held next to and parallel to each other by rail clamp 12, comprising clamp top 16 and clamp bottom 18 joined by the tightening of screw 46.

Figure 12:
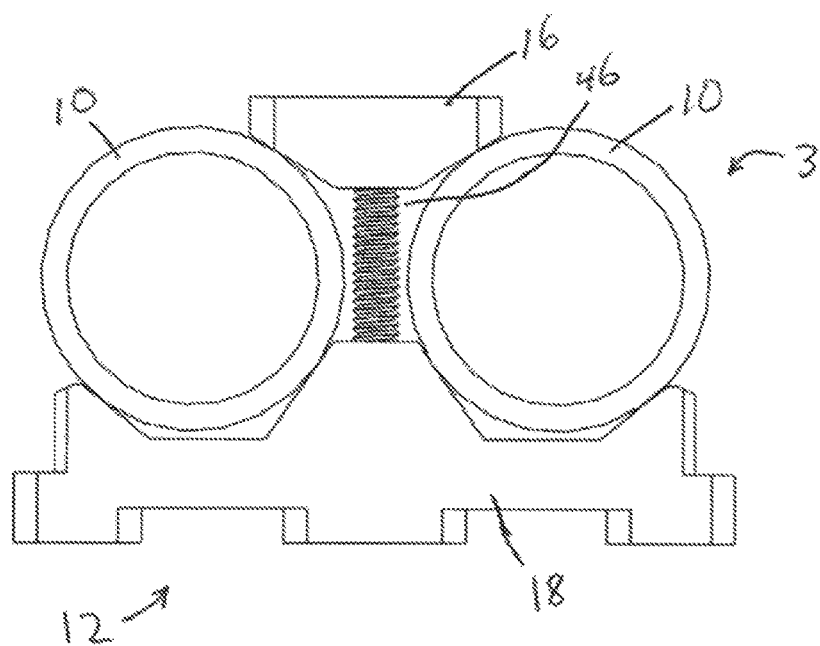
FIG. 12 is an enlarged side view of the embodiment shown in FIG. 11.

Turning now to FIG. 12, the exemplary embodiment of system 3 shown is the same as that shown in FIG. 11 and substantially the same as that shown in FIG. 5A except that the embodiment of FIG. 11 does not include a skater. All angles of this embodiment are substantially as shown. The system is salable to different sizes.

Figure 13:
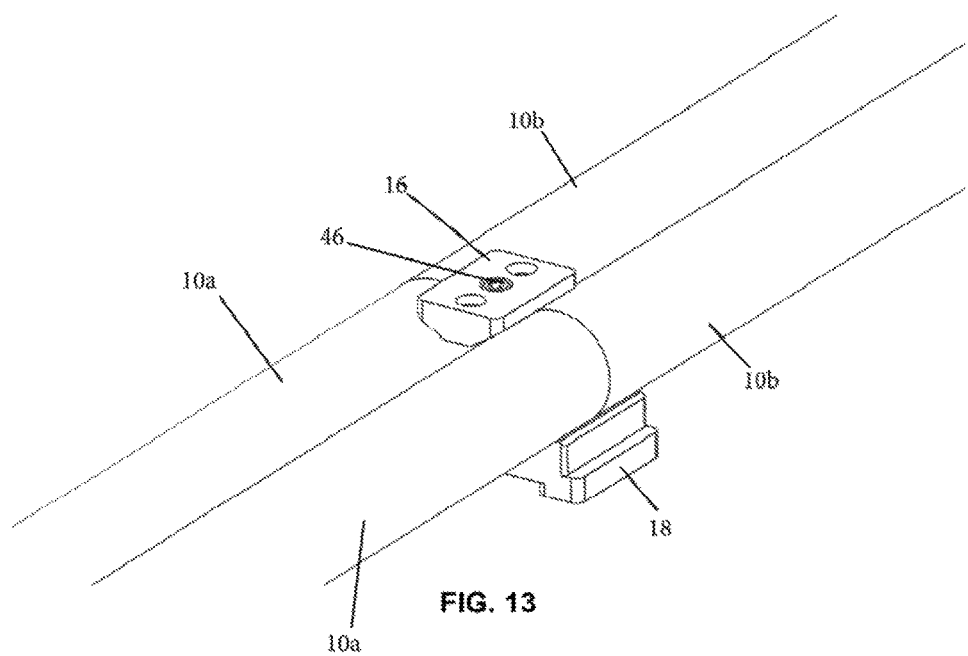
FIG. 13 shows an embodiment in which the rail clamp 12 holds rails 10a and 10b end-to-end while at the same time securing rails 10a and 10a side-by-side and rails 10b and 10b side-by-side.

Turning now to FIG. 13, the exemplary embodiment shown illustrates that rail clamp 12 can join pipes 10a and 10b end-to-end while at the same time securing pipes 10a and 10a side-by-side and pipes 10b and 10b side-by-side.

In any embodiment of any of systems 1, 2, and 3 that comprises more than one rail clamp, it is preferred that all of the rail clamps are a rail clamp 10 as described and illustrated herein, or an obvious variation thereon.

The person of ordinary skill in the art will be able to make obvious variations of the invention described herein and the embodiments of the invention described herein by applying no more than an ordinary level of skill. Such variations are considered within the scope of the claimed invention.

What is claimed is:

1. A track system on which a skater dolly can roll, comprising:
   one or more pairs of side-by-side rails, and
   one or more rail clamps, wherein:
   at least one rail clamp comprises a clamp top, a clamp bottom and a clamp screw that joins the clamp top to the clamp bottom,
   and further wherein said at least one rail clamp secures in place at least one pair of side-by-side rails, and holds each member of each secured pair parallel to the other member of the pair,
   the distance between rails is between about 5/16 inches and about 3 inches,
   the clamp top comprises two angled lower surfaces, each of which makes contact with one of the rails,
   and the clamp bottom comprises two depressions, each of which supports one rail,
   the track system further comprising a skater dolly,
   wherein the skater dolly comprises a set of four load-bearing wheels and a set of four stabilizing wheels,
   wherein the load-bearing wheels are angled 20-30 degrees away from vertical and the stabilizing wheels are approximately perpendicular to the load-bearing wheels,
   and further wherein the skater dolly can roll along the rails of the track system.

2. The track system of claim 1, in which each depression of the clamp bottom is formed by three flat faces angled such that one face is horizontal and the other two are non-horizontal, and each non-horizontal face makes contact with the rail that the corresponding depression supports while the horizontal face does not make such contact.

3. The track system of claim 2, wherein the distance between rails is about 5/16 inches.

4. The track system of claim 3, further comprising a motor pulley system that moves the skater along the rails, wherein the motor pulley system comprises a motor assembly mounted on the skater, a belt, and idler pulleys.

5. The track system of claim 3, wherein the load-bearing wheels are angled about 25 degrees away from vertical.

6. The track system of claim 4, wherein the load-bearing wheels are angled about 25 degrees away from vertical.

7. The track system of claim 2, comprising at least two pairs of side-by-side rails, wherein at least one rail clamp secures two pairs of rails end-to-end, such that end-to-end rails are aligned with each other and side-by-side rails are parallel to each other.

* * * * *